United States Patent [19]

O'Neal et al.

[11] Patent Number: 5,236,066
[45] Date of Patent: Aug. 17, 1993

[54] FOOT OPERATED WHEEL BRAKE

[76] Inventors: Daniel M. O'Neal, 56 Hawthorne; Michael Kovac, #7 Williamsburg Estates, both of St. Louis, Mo. 63131

[21] Appl. No.: 699,721

[22] Filed: May 14, 1991

[51] Int. Cl.$^5$ .............................................. B60B 33/00
[52] U.S. Cl. .................. 188/1.12; 16/35 R; 188/74; 280/33.984
[58] Field of Search ............... 188/1.12, 29, 74, 19, 188/20, 21; 280/33.994; 16/35 R

[56] References Cited

U.S. PATENT DOCUMENTS

| D. 288,285 | 2/1987 | Simmons | 188/1.12 X |
|---|---|---|---|
| 2,138,433 | 11/1938 | Sunden | 188/1.12 X |
| 2,484,094 | 10/1949 | Jackson | 188/1.12 X |
| 2,915,775 | 12/1959 | Skupas | 16/35 R |
| 3,493,085 | 2/1970 | Libhart | 16/35 R |

FOREIGN PATENT DOCUMENTS

| 3346722 | 6/1985 | Fed. Rep. of Germany | 16/35 R |
|---|---|---|---|
| 2504066 | 10/1982 | France | 16/35 R |
| 1159716 | 7/1969 | United Kingdom | 16/35 R |
| 1377155 | 12/1974 | United Kingdom | 188/1.12 |

Primary Examiner—George E. A. Halvosa
Attorney, Agent, or Firm—Kalish & Gilster

[57] ABSTRACT

A wheel brake for shopping carts and other wheeled equipment is disclosed. Typically, shopping carts and other wheeled equipment have a yoke depending from a lower end of a leg support, the yoke including a pair of generally parallel downwardly extending arms. A wheel is rotatably mounted on an axle extending between these downwardly extending arms. In order to provide selective braking engagement of the wheel to immobilize the shopping cart or other wheeled equipment, a brake tongue is pivotally mounted at one end to the yoke above the wheel and extends across at least a part of the wheel. A foot pedal is pivotally mounted to the yoke in spaced relationship to the brake tongue for movement between engaged and released positions relative to the wheel. The foot pedal includes a depending brake element for engaging and depressing the brake tongue into selective braking engagement with the wheel when the foot pedal is moved into engaged position by a user. A spring biased camming structure operatively engages both the depending brake element and the brake tongue for maintaining the depending brake element in releasable locking engagement with the wheel through the brake tongue until the foot pedal is moved to a released position by a user. The present invention also includes a method of assembling a wheel brake to an existing yoke depending from a lower end of a supporting leg. Thus, the present invention contemplates adapting existing shopping carts or other wheeled equipment to include a wheel brake, as well as contemplates the use of the wheel brake as original equipment on new shopping carts or other wheeled equipment.

2 Claims, 6 Drawing Sheets

FOOT OPERATED WHEEL BRAKE

BACKGROUND OF THE INVENTION

The present invention is a foot operated wheel brake for shopping carts or other wheeled equipment, and more particularly, to a positive locking, selectively operating foot actuated wheel brake for selective releasable braking engagement with respect to a rotatably mounted wheel on a shopping cart or other wheeled equipment, so as to immobilize the shopping cart or other wheeled equipment.

Various types of brake devices or assemblies for different types of wheeled equipment have been developed. In general, such brake devices or assemblies are designed to prevent rotation of a single wheel in such wheeled equipment, so as to immobilize same. Examples of such foot operated brake devices or assemblies include U.S. Pat. Nos. 3,493,085; 4,035,864; 4,349,937; and U.S. Pat. No. Des. 288,285. While such prior art brake devices or assemblies have found usefulness in certain types of wheeled equipment, they have not been used in shopping carts, even though there is a great need for such devices in order to prevent the prevent the problem of runaway shopping carts.

Shopping carts are wonderful to use except when it comes to loading a car from the shopping cart or trying to find a place to leave the shopping cart, after use. Users easily remember the many frustrating experiences they have encountered in trying to unload groceries or other products from a shopping cart into a car. Since there is nothing presently used on the shopping cart which would prevent it from rolling away, the user must somehow hold on to the shopping cart, while unloading same. Typically, users hold the cart with their feet or other parts of their bodies, while unloading the contents of the cart into a car. This problem is more than simply an inconvenience or frustration because the shopping cart can easily roll away and cause damage to the user's car or other cars nearby, as well as the cart itself. Additionally, injury to users or other people passing by is also a problem with runaway carts.

After use of the shopping cart, the user looks for a place to leave it. For this purpose, cart corrals have been developed, for storing and nesting the shopping carts, after use. Users are expected to position the shopping cart in the cart corral after use; however, many shoppers do not use cart corrals, for a variety of reasons. As will be appreciated, this creates another potential runaway cart problem, where the topography and/or high winds cause the cart to move to an unwanted location.

Runaway shopping carts have been clocked at speeds exceeding 30 mph in high winds. Carts travelling at such speeds can cause serious injury to pedestrians and motorists. Damage to vehicles increases during periods of high winds, due to runaway carts. Damage to the carts themselves are also a problem because substantial repair costs are involved. The average shopping cart costs between $170 and $450, in the early 1990's. Repair and/or replacement of the damaged carts is an ever present problem to a store owner.

The runaway shopping cart not only creates the potential for injury and inconvenience to users, but damage to vehicles (on both lots and adjoining streets), as well as damage to the carts themselves. In addition, increases in insurance premiums and deductibles may also occur. Repair of minor shopping cart damage may cost $200 or more. Oftentimes, the store owner's deductible will not cover the costs associated with repairing damage to vehicles, not to mention the damage to the cart itself.

As will be disclosed in the specific description of the invention that is to follow, the wheel brake of the present invention overcomes the aforementioned problems primarily encountered with shopping carts, although the wheel brake of the present invention may be employed on other types of wheeled equipment, as may be desired.

SUMMARY OF THE INVENTION

Among the several objects and advantages of the present invention include:

The provision of a new and improved wheel brake for shopping carts and other wheeled equipment;

The provision of the aforementioned wheel brake which provides positive and selected braking engagement with respect to a rotatably mounted wheel for shopping carts or other wheeled equipment;

The provision of the aforementioned wheel brake which provides positively engaged and controlled locking engagement of a rotatably mounted wheel, while facilitating immediate release thereof, when desired;

The provision of the aforementioned wheel brake which is quickly and easily engaged and disengaged or released by a user;

The provision of the aforementioned wheel brake which eliminates the problem of runaway shopping carts, thereby eliminating injury and inconvenience to users, damage to vehicles, and damage to carts, while also minimizing increases in insurance premiums and deductibles;

The provision of the aforementioned wheel brake which is long lasting and extremely durable, while requiring little maintenance or replacement of parts; and The provision of the aforementioned wheel brake which can be economically manufactured by existing technology; is simple to operate, requires a minimum number of parts, and is otherwise well adapted for the purposes intended.

Briefly stated, the wheel brake of the present invention is associated with a yoke depending from a lower end of a leg support. The yoke includes a pair of generally parallel downwardly extending arms with a wheel rotatably mounted on an axle extending between the arms. For positive and selective braking engagement of the wheel, a brake tongue is pivotally mounted on one end to the yoke above the wheel and extends across at least a part of the wheel. A foot pedal is also pivotally mounted to the yoke in spaced relationship to the brake tongue for movement between engaged and released positions relative to the wheel. The foot pedal includes a depending brake element for engaging and depressing the brake tongue into braking engagement with the wheel when the foot pedal is moved into engaged position by the user. Spring biased camming means operatively engage both the depending brake element and the brake tongue for maintaining the depending brake element in releasable braking engagement with the wheel through the brake tongue, until the foot pedal is moved to a released position by a user, thereby disengaging the depending brake element from the brake tongue.

The spring biased camming means include spring means connected between the depending brake element and the brake tongue, and cam means operating between the depending brake element and the brake tongue. In certain embodiments, the spring means and cam means are connected to one another in juxtaposed relationship. In other embodiments, the spring means and cam means are spaced from one another.

One example where the spring means and cam means are connected to one another in juxtaposed relationship is where the depending brake element includes a lower camming surface for engaging the brake tongue. A pivot shaft supports the foot pedal between the arms of the yoke, the pivot shaft being received within an elongated opening formed in the depending brake element for upward and downward movement of the depending brake element. A spring is captured between the foot pedal pivot shaft and the lower camming surface of the depending brake element. The aforementioned construction provides spring biased camming engagement between the depending brake element and the brake tongue until the foot pedal is moved to a released position.

Another example showing juxtaposed spring means and cam means is where the brake tongue includes an upwardly directed end section at a free end thereof. A cam slot is formed in the upwardly directed end section, and the depending brake element includes a cam follower extending through the cam slot of the brake tongue. Spring means are mounted on the depending brake element between the cam follower and the foot pedal to work in conjunction with the cam follower and cam slot to releasably engage and disengage the brake tongue relative to the wheel upon engaged or released operation of the foot pedal.

In certain other embodiments where the spring means and cam means are spaced from one another, the spring means is interconnected between the brake tongue and the yoke in spaced relation to the cam means provided on the depending brake element. Such spaced spring means and cam means can include a pivot shaft for the foot pedal which extends between the arms of the yoke. The spring has one end attached to the brake tongue at a position spaced from the depending brake element and a second end connected to the foot pedal pivot shaft. In conjunction therewith, a lower camming surface is formed on the depending brake element for camming engagement with the brake tongue, when the foot pedal is moved into engaged position relative to the wheel.

In still another embodiment of the invention, the brake tongue is connected along a lower end of the depending brake element, the depending brake element further including the spring associated therewith, and the brake tongue is further configured to engage the wheel in braking engagement when held by the aforementioned spring biased camming means in releasable braking engagement with the wheel.

In yet still another embodiment, the spring biased camming means is operatively associated with the depending brake element, without the need for a brake tongue, in order to maintain the depending brake element in releasable braking engagement directly with the wheel itself, until the foot pedal is moved to a released position by a user where the depending brake element disengages the wheel.

In the preferred embodiment, the depending brake element has a lower brake surface which is positioned to engage and capture the brake tongue between the depending brake element and the wheel for braking engagement with the wheel when the foot pedal is moved into engaged position by a user. In conjunction therewith, means, preferably in the form of spring biased camming means, are provided for maintaining the depending brake element of the foot pedal in releasable locking engagement with the brake tongue until the foot pedal is moved to a released position by a user where the depending brake element disengages the brake tongue. Such means includes spring means or spring biased locking means or spring biased locking-/camming means which are operatively associated with the brake tongue and the depending brake element.

The brake tongue is preferably formed from a resilient and deformable material enabling the brake tongue to generally conform to the wheel along the engaged and captured areas of the brake tongue.

The foot pedal includes engaged and released foot levers which are offset at an obtuse angle from one another, to facilitate operations by a user. The engaged foot lever of the foot pedal is also constructed to extend substantially parallel to a supporting surface when the depending brake element is in releasable braking engagement with the wheel through the brake tongue.

When the wheel brake is subsequently mounted to existing equipment, the yoke includes a first yoke attached to the leg support which initially mounts the wheel, and a second yoke mounted over the first yoke while also rotatably mounting the wheel as well as the other aforementioned elements forming the wheel brake.

In addition to the aforementioned wheel brake constructions, the present invention also discloses a method of assembling a wheel brake to a first yoke depending from a lower end of a supporting leg, as provided in original wheeled equipment. The first yoke an upper wall and a pair of generally parallel downwardly extending arms with a wheel rotatably mounted on an axle supported by a first axle opening in both the generally parallel arms. The assembly steps include providing a wheel brake with a complementary second yoke also having an upper wall and generally parallel downwardly extending arms, all of which are larger in size than the first yoke, the complementary configured second yoke also having a second axle opening at a lower end of the arms; removing the axle from the wheel and first yoke; placing the second yoke over the first yoke while aligning the first and second axle openings; re-inserting the axle into the first and second axle openings and the wheel; and securing the upper walls of the first and second yokes to each other.

The axle may be re-inserted into the first and second openings before or after the upper walls of the first and second yokes are secured to one another. The securing steps includes the fastening of the upper walls of the first and second yokes, preferably through the use of complementary threaded fastening means in the upper walls of the first and second yokes.

These and other objects and advantages of the present invention will become apparent from the following description.

BRIEF DESCRIPTION OF THE DRAWINGS

In the drawings.

Corresponding reference numerals will be used throughout the several figures to designate like parts.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptions, variations, alternatives and uses of the invention, including what we presently believe is the best mode of carrying out the invention.

Figure 1:
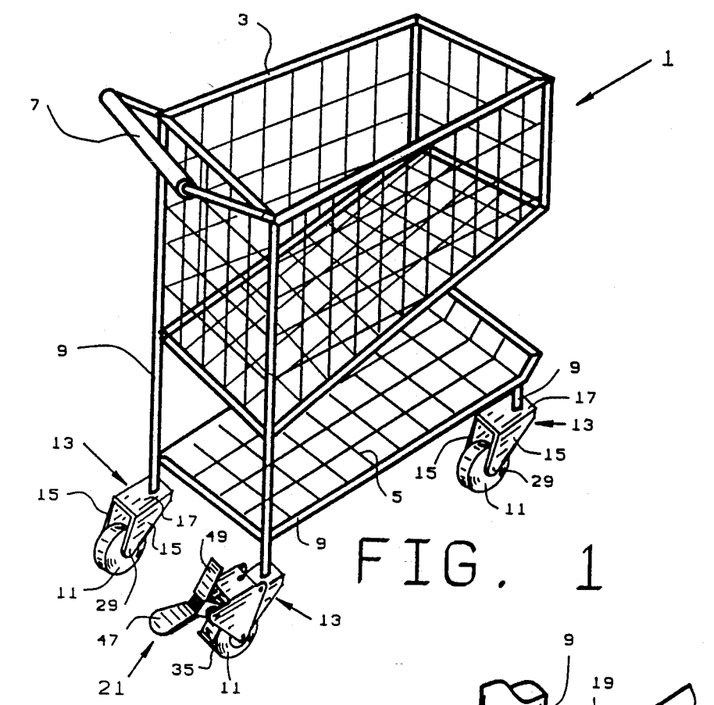
FIG. 1 is a perspective view of a typical shopping cart with the wheel brake of the present invention mounted on the right rear wheel thereof.

The foot operated wheel brake of the present invention is designed primarily for use in connection with shopping carts, shown for example in FIG. 1 of the drawings; however, it will also be understood that the foot operated wheel brake may also be used on other types of wheeled equipment or other products, as may be desired. Furthermore, it is to be understood that the wheel brake of the present invention may be made from metal, plastic or any other material, including a combination of such materials, if desired.

In FIG. 1 of the drawings, a typical shopping cart 1 is illustrated as having a large wire basket 3, lower wire shelf 5 and a handle 7. Interconnecting leg supports 9 extend for the full height of the cart at the rear thereof and have wheels 11 attached thereto through an interconnecting yoke 13. At the front of the cart, the leg supports 9 are shown as being attached to lower shelf 5, with wheels 11 also mounted thereto through an interconnecting yoke 13. It will be understood, of course, that the particular shape and construction of the shopping cart forms no part per se of the present invention, but is shown in the drawings to facilitate an understanding of how the foot operated wheel brake of the present invention is preferably employed.

Figure 2:
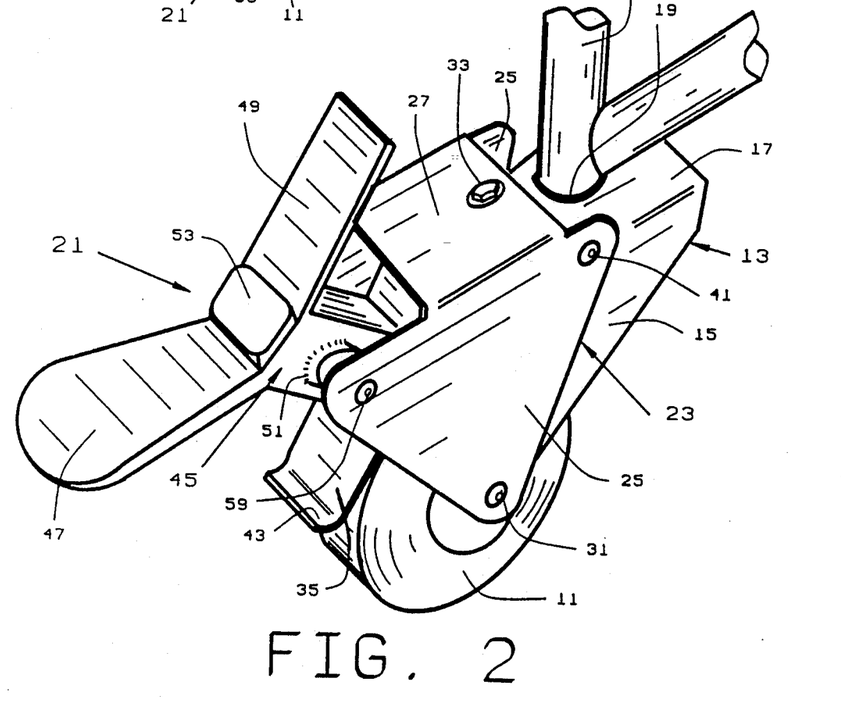
FIG. 2 is an enlarged perspective view of the wheel brake of the present invention as mounted to the right rear wheel of the shopping cart, as shown in FIG. 1.

Similarly, the shape and construction of the yoke 13 and a manner in which is attached to the leg supports 9 can be varied to suit the particular desired. Each yoke 13, whatever the shape or construction, preferably includes a pair of generally parallel downwardly extending arms 15, 15 which are interconnected, preferably integrally, through an upper wall or bight end portion 17, to which the leg support 9 is secured, as best seen in FIGS. 1-2 of the drawings.

Figure 7:
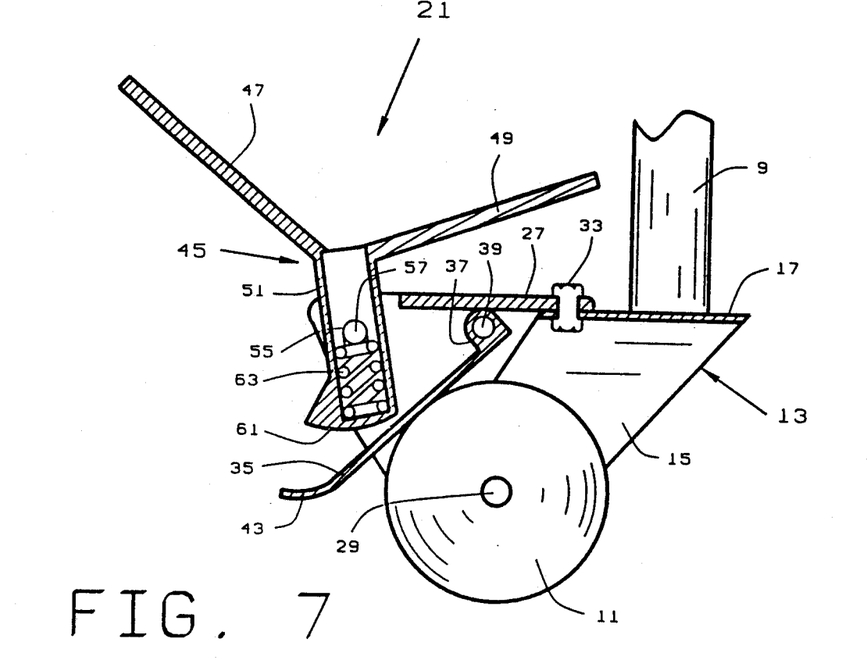
FIG. 7 is a side sectional view of the wheel brake shown in FIGS. 1-6 of the drawings in disengaged or released position relative to its associated wheel.
Figure 8:
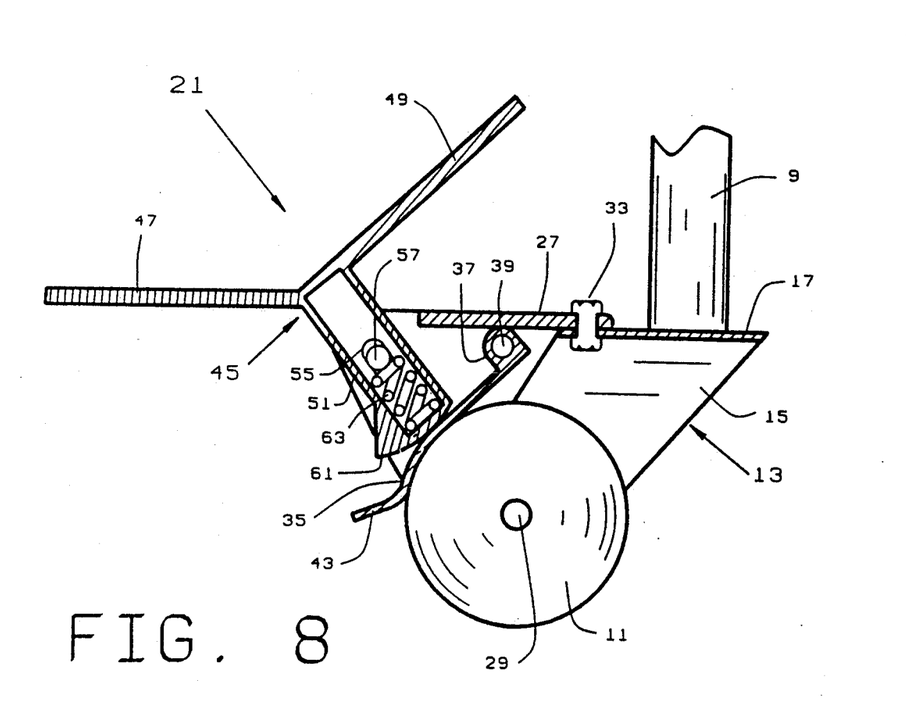
FIG. 8 is a side sectional view illustrating the wheel brake in FIGS. 1-7 as being in engaged position relative to its associated wheel.
Figure 9:
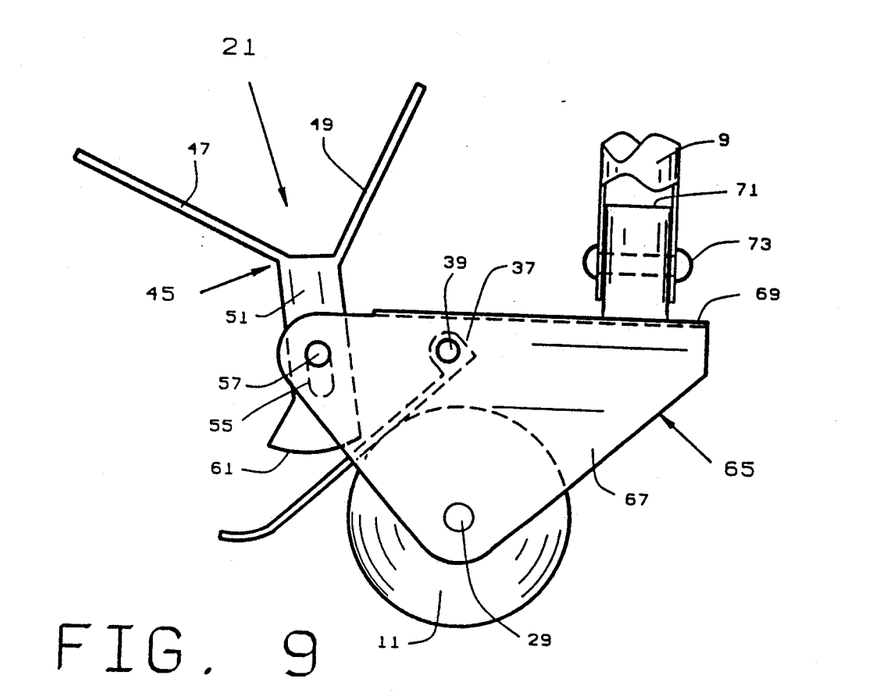
FIG. 9 is a side elevational view, with phantom lines, illustrating the wheel brake of the present invention as being incorporated into a new shopping cart or other wheeled equipment, the wheel brake being attached by a rivet or other fastening means to a lower leg support.
Figure 10:
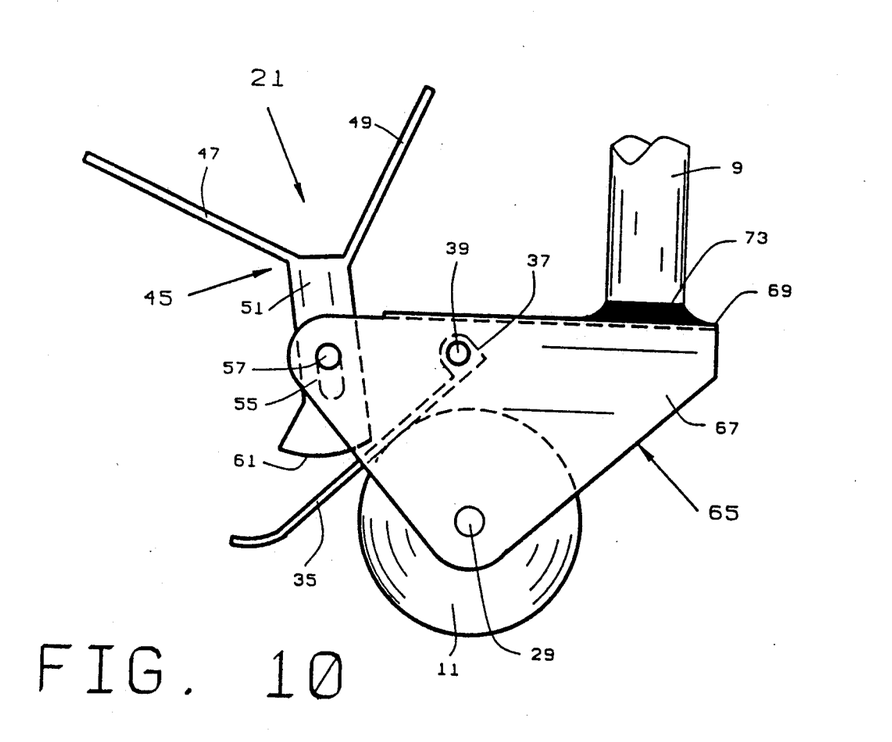
FIG. 10 is a side elevational view, partially in hidden lines, also illustrating the wheel brake of the present invention as incorporated into a new shopping cart or other wheeled equipment, the wheel brake being welded or otherwise joined to a lower leg support, as illustrated.

According to a present invention, the foot operated wheel brake 21 can be either mounted on a second yoke 23 surrounding yoke 13, as shown in FIGS. 1-8 of the drawings, or alternatively, for original equipment shopping carts, the yoke 13 may be constructed as shown in FIGS. 9-10 of the drawings to enable the foot operated wheel brake 21 to be an integral part of the original yoke 13, as will be subsequently discussed.

Turning first to the foot operated wheel brake 21 construction shown in FIGS. 1-8 of the drawings, it will be seen that the foot operated wheel brake 21 includes the second yoke 23 having a pair of generally parallel downwardly extending arms 25, which are interconnected by an integral upper wall or bight end portion 27, as illustrated. The second yoke 23, including the pair of generally parallel downwardly extending arms 25, 25 and the interconnecting upper wall 27 is slightly larger than the corresponding pairs of arms 15, 15 and interconnecting upper wall 17 of the first yoke 13, in order to allow the second yoke 23 to be positioned in overlapping relationship to the first yoke 13, as illustrated in the drawings. It will be noted that the pairs of depending arms, 15, 15 in the case of the first yoke, and 25, 25 in the case of the second yoke 23, may have a general triangular shape. The shape of the second yoke 23 was chosen since the first yoke 13 is typically, though not necessarily, made with a generally triangular shape.

At the lower end of each of the pairs of arms 15, 15 in the first yoke 13 and arms 25, 25 in the second yoke 23, there is provided first and second axle openings (not shown), for receiving an axle 29, which rotatably supports the wheel 11. Suitable fastening means in the form of rivets 31 or the like may be employed for securing the axle 29 to depending arms 15, 15 and 25, 25 of the first and second yokes 13, 23 respectively.

It will be further noted that a fastening element 33 also secures the yoke 23 to the yoke 13, through engagement of the upper walls 27, 17 thereof. As is illustrated, the fastening element 33 extends through the upper wall 27 of the second yoke 23 and then into the upper wall 17 of the first yoke 13. For this purpose, a thread cutting screw or complementary threaded fastening elements may be employed, as may be desired.

When it is desired to mount the foot operated wheel brake 21 on existing shopping cart 1, the wheel 11 must be first separated from the first yoke 13, allowing the axle 29 to be removed. Thereafter, the second yoke 23 is mounted over the first yoke, and either the axle 29 is first re-inserted into the first and second axle openings of the first and second yokes 13, 23 before the upper walls 17, 27 of the first and second yokes 13, 23 are secured to one another, or the axle 29 is re-inserted into the first and second axle openings after the upper wall 17, 27 of the first and second yokes 13, 23 are secured to one another. In either case, when the second yoke 13 is mounted to the first yoke through the combined structure of the axle 29, which engages both arms 15, 15 and 25, 25 of the first and second yokes 13, 23, while the upper walls 17, 27 of the first and second yokes 13, 23 are secured together by the fastening element 33, a very secure mounting of the second yoke 23 to the first yoke 13 is constructed, thereby enabling the second yoke 23 to operate as if it were an extension of the first yoke 13, without losing structural integrity or support.

Figure 3:
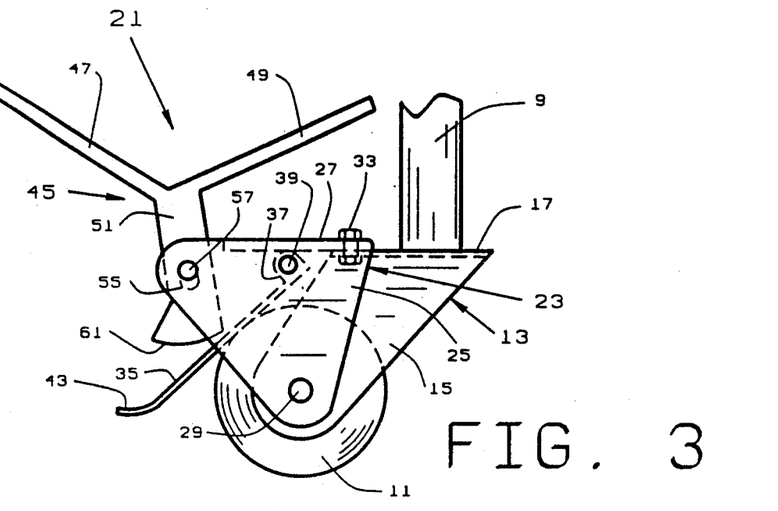
FIG. 3 is a side elevational view, partially in phantom lines, illustrating the wheel brake of the present invention in released or disengaged position relative to an associated wheel.
Figures 4, 5, 6:
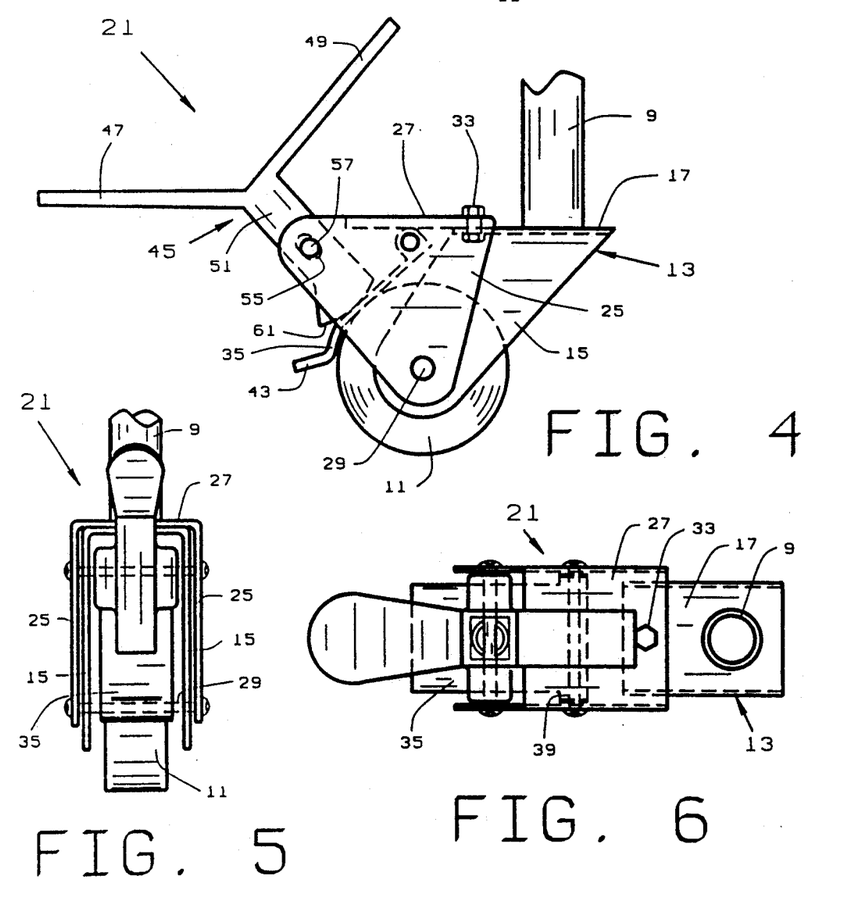
FIG. 4 is a fragmentary side elevational view, partially in phantom lines, illustrating the wheel brake of the present invention in engaged position and showing selective braking engagement relative to an associated wheel.
FIG. 5 is a rear end elevational view of the wheel brake construction illustrated in FIGS. 1-4 of the drawings.
FIG. 6 is a top plan view of the wheel brake construction illustrated in FIGS. 1-5 of the drawings.

Referring now to the other components of the foot operated wheel brake embodiment shown in FIGS. 1-8 of the drawings, it will be seen that there is an elongated brake tongue 35 having an upstanding apertured section 37 at one end for receipt of a pivot shaft 39. The pivot shaft 39 may be secured to the pair of depending arms 25, 25 of the second yoke 23 through the rivets 41 or the like shown in FIG. 2 of the drawings. The brake tongue is pivotally mounted to the yoke 23 above the wheel 11 and extends across the wheel and terminates in an upwardly curving outer free end 43. The length of the brake tongue 35 may be varied to suit the particulars desired, but preferably extends as illustrated in the drawings, in order that a foot pedal 45, hereafter described, may be moved in relationship thereto, for fulfilling the purposes of the present invention. Thus, the length of the brake tongue 35 prevents any unnecessary interference with the foot pedal 45, hereafter described, while having a width generally corresponding to the width of the wheel 11, as shown in FIG. 5 of the drawings.

The brake tongue 35 may be formed from any suitable material, but preferably is formed from a ultra high density molecular weight plastic material such that it is both resilient and deformable. That is, the brake tongue 35 is sufficiently strong to allow it to conform to an outer portion of the wheel 11, as will be subsequently described, while also allowing it to return to its initial un-deformed configuration. Alternatively, the brake tongue 35 may be formed of rigid material, if desired.

The foot pedal 45 is pivotally mounted to the second yoke 23 in spaced relationship to the brake tongue 35, as is illustrated in FIGS. 1-8 of the drawings, for movement between engaged and released positions relative to the wheel. More specifically, the foot pedal 45 includes an engaged wheel lever 47 and a non-engaged or released foot lever 49, which are offset at an obtuse angle relative to one another to facilitate operation thereof. The engaged wheel lever 47 has a beaver-tail shape, to enable a user to readily step upon and depress same, for pivoting the foot pedal 45. The non-engaged or released foot lever 49 has a rectangular shape, to distinguish between the two levers. Obviously, other shapes can be employed, as desired. Further, ridges or other separate elements, such as a rubber pad or the like, may be attached to the upper surface of the engaged and/or released levers 47, 49, to prevent foot slippage.

Extending away from the engaged and released levers 47, 49, respectively, of the foot pedal 45 is a depending brake element 51, which preferably has a hollow construction, except at a lower end thereof, for reasons which will appear hereafter. The engaged and released levers 47, 49 and the depending brake element 51 are preferably cast from aluminum or molded from other high strength materials, as integral elements, as illustrated in the drawings.

As best seen in FIG. 2 of the drawings, a closure or cap 53 overlies the open upper end of the hollow portion of the depending brake element 51. The depending brake element 51 further includes an elongated slot 55 formed transversely therethrough for receiving the pivot shaft 57 that also extends therethrough and is attached to the pair of depending arms 25, 25 of the second yoke 23. A rivet 55, or other fastening means, as shown in FIG. 2 of the drawings, may be used to secure the pivot shaft 57 to the second yoke 23 on the upper left hand corner of the triangularly-shaped second yoke 23.

As best seen in FIGS. 3-4 and 7-8 of the drawings, the lower end surface 61 comprises a curvilinear cam surface, which also closes off the hollow depending brake element 51 at the lower end thereof. Within the depending brake element 51, and interposed between the pivot shaft 57 and the closed lower end 61 of the depending brake element, is a coil spring 63 as shown in FIGS 7-8 and 15-16. The coil spring 63 works in conjunction with elongated slot 55, the lower camming surface 61 and the brake tongue 35 to apply selective braking engagement of the foot pedal 45 relative to the wheel 11.

More specifically, and with specific reference to FIGS. 7-8 of the drawings, it will be seen that as the engaged wheel lever 47 of the foot pedal 45 is depressed to a position where it is substantially parallel to a supporting surface, the lower cam surface 61 of the depending brake element 51 will be moved into contact with the resilient and deformable brake tongue 35. During such movement, the coil spring 63 will be compressed between the pivot shaft 57 and the lower closed end of the depending brake element 51, causing the depending brake element 51 to shift upwardly, as shown in FIG. 8, as a result of movement of the pivot shaft 57 relative to the elongated slot 55. When the coil spring 63 is compressed, the pivot shaft 57 preferably bottoms out on the lower curved end of the elongated slot 55 to prevent any rotation or slippage of parts. Despite the upward movement of the depending brake element 51, the construction and arrangement of the parts is such that it causes an increased pressure or force to be applied to the brake tongue 35. This is due to the fact that the coil spring 63 remains compressed between the pivot shaft 57 and the lower closed end of the depending brake element 51. As a result, the brake tongue 35 is thus engaged with sufficient pressure or force to cause it to conform to at least part of the outer periphery of the wheel 11. At the same time, the brake tongue 35 applies a braking force or engagement against the wheel 11, so as to prevent rotation thereof.

While the lower camming surface 61 of the depending brake element 51 can be constructed to come into direct contact with the wheel 11 and apply a braking force thereon without the need for a brake tongue 35, preferably the brake tongue 35 is employed since it serves as a neutral element between the depending brake element 51 and the wheel 11. In other words, the brake tongue 35 serves as a neutral or independent element which does not allow the wheel 11 or the depending brake element 51 to become easily dislodged from one another.

Once the engaged wheel lever 47 is depressed to the position shown in FIG. 8 of the drawing, where it is preferably substantially parallel to a supporting surface for ease of operation by a user, the foot pedal 45, including particularly the depending brake element 51, will be maintained in engagement with the wheel 11 through the brake tongue 35 for maintaining the braking force desired. In addition to the operation of the components described above, it is to be noted that the depending brake element 51, when in the FIG. 8 position, is at least partially within the confines of a plane extending between the pivot shaft 57 of the foot pedal 45 and the axle 29 of the wheel. As a result, substantial forces will be applied and maintained through the coil spring 63 and lower surface 61, maintaining the desired braking engagement.

To further prevent disassociation of the depending brake element 51 from the brake tongue 35, the elongated slot 55 may be angularly offset, in a clockwise direction from that shown in FIGS. 3-4, perhaps even only a few degrees, to resist a releasing movement of the depending brake element 51. In other words, the pivot shaft 57 would more aggressively engage the angularly offset elongated slot 55 to resist retrograde or releasing movement of the depending brake element 51.

Release of the wheel brake 21 from the wheel 11 is easily accomplished by simply depressing the non-engaged or released lever 49 of the foot pedal 45 with the user's foot, causing the foot pedal 45 to pivot about the pivot shaft 57, thereby disengaging the coil spring 63 and lower end surface 61, as shown in FIG. 7 of the drawings. Depending brake element 51 is thus moved out of engagement with the brake tongue 35, which itself is returned to its original non-deformed configuration. The brake tongue 35 may ride on the wheel 11; however, because it is made from ultra high molecular weight plastic or other extremely durable, yet resilient and deformable material, wear and tear, if any, on either the brake tongue 35 or on the outer periphery of the wheel 11 will be minimal.

Reference is now made to FIGS. 9-10 of the drawings which show a modified form of foot operated wheel brake 21, as it would be incorporated in original or new shopping carts, rather than being applied to existing shopping carts, as shown in the FIGS. 1-8 embodiment. In the FIG. 9 embodiment, there is a single yoke 65, generally triangular shaped, which approximates the size of the first and second secured yokes 13, 23 in the FIGS. 1-8 embodiment. This one-piece single yoke 65 includes a pair of generally parallel downwardly extending arms 67, 67 and an upper wall or bight end portion 69 to which all components of the shopping cart 1 and the wheel brake 21 are connected. In this connection, note that the wheel 11 is connected through the axle 29 at the lower end of the single yoke 65, as in the previous embodiment. For attaching the single yoke 65 to leg support 9, a complementary shaped short tube 71 is inserted within the lower end of the supporting leg 9 and is secured thereto as by the rivet 73 or other suitable fastening means. The remaining components in the FIG. 9 embodiment are attached to the single yoke 65, in much the same manner as the foot operated wheel brake 21 components are attached to the second yoke 23 in the FIGS. 1-8 embodiment. In FIG. 10 of the drawings, the supporting leg 9 is welded or otherwise secured as at 73 to the upper wall 69 of the single yoke 65. In all other respects, the FIG. 10 embodiment, like the FIG. 9 embodiment, has the same components and operates in the same manner as the foot operated wheel brake 21 in the FIGS. 1-8 embodiment.

Figure 11:
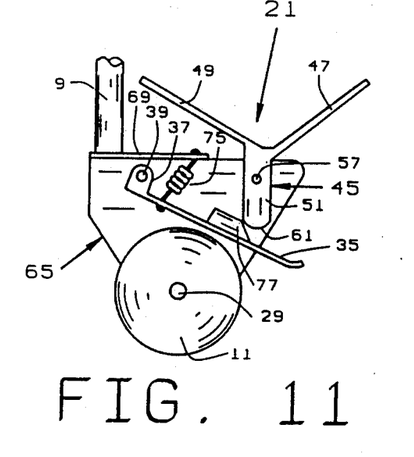
FIG. 11 is a reduced in size side sectional view illustrating a modified form of wheel brake, the latter being in disengaged or released position.
Figure 12:
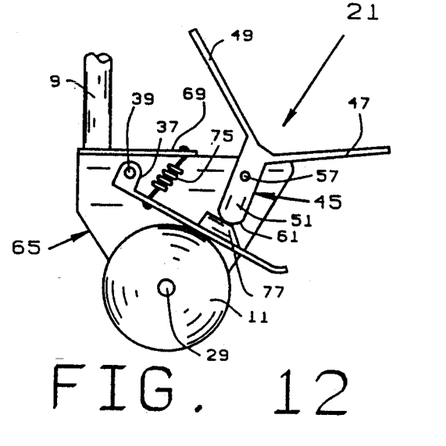
FIG. 12 is a reduced in size side sectional view of the wheel brake construction shown in FIG. 11, shown in engaged position.
Figure 13:
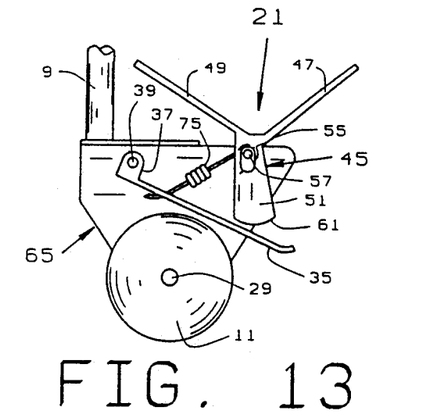
FIG. 13 is a side sectional view of still another modified form of wheel brake constructed in accordance with the present invention, shown in disengaged or released position.
Figure 14:
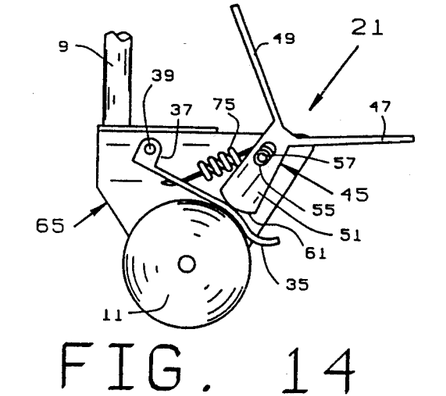
FIG. 14 is a side sectional view showing the FIG. 13 embodiment in engaged position relative to its associated wheel.

Other embodiments of the invention are shown in FIGS. 11-12; FIGS. 13-14; FIGS. 15-16 and FIGS. 17-21 of the drawings. In each of these embodiments, like reference numerals have been employed to designate corresponding parts throughout the various figures of the drawings. Also, for ease of understanding, the single yoke 65 is shown in each of these embodiments, although it will be understood that first and second yokes 13, 23 may also be employed, as in the FIGS. 1-8 embodiment.

In the FIGS. 11-12 embodiment, it will be seen that the foot operated wheel brake is in non-engaged or released position in FIG. 11 and in engaged position in FIG. 12. In this embodiment, a separate coil spring 75 is connected between the brake tongue 35 on the upper wall 69 of the single yoke 65, generally closer to the pivot shaft 39 than the outer free end 43 of the brake tongue 35. The brake tongue 35 is also provided with an upwardly extending cam element 77, which cooperates with the lower end surface 61 of the depending brake element 51, to cause the foot pedal to be pivoted on the pivot shaft 57 as illustrated in FIG. 12 of the drawings, when the foot pedal 45 is moved from the released to the engaged position. Thus, the FIGS 11-12 embodiment show a separate coil spring which is separate from the cam, with the depending brake element action further comprising the depending brake element 51 the cam element 27 and the brake tongue 35, for cooperative camming engagement, as is illustrated.

In the FIGS. 13-14 embodiment, the upper end of the separate coil spring 75 is attached to the pivot shaft 57, rather than to the upper wall 69 of the single yoke 65, as in the FIGS. 11-12 embodiment. As the foot pedal 45 is moved from the released position shown in FIG. 13 to the engaged position shown in FIG. 14, the lower camming surface of the depending brake element 51 will engage the brake tongue 35, and at the same time, the separate coil spring 75 will be extended causing the pivot shaft 57 to be moved relative to the elongated slot 55 of the depending brake element 51, as in the FIGS. 1-8 embodiment.

Figure 15:
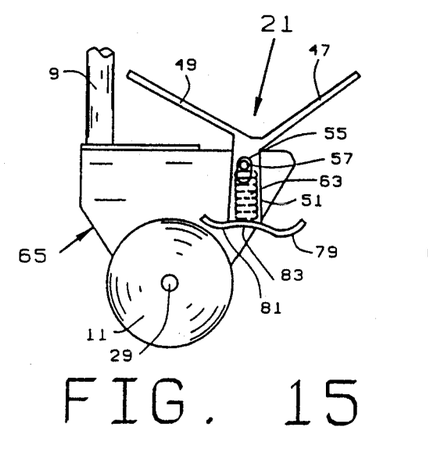
FIG. 15 is a reduced in size side sectional view of still another embodiment of wheel brake constructed in accordance with the present invention, shown in disengaged or released position.
Figure 16:
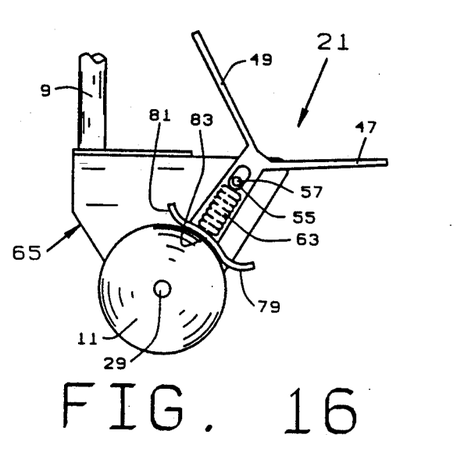
FIG. 16 is a reduced in size side sectional view of the embodiment shown in FIG. 15, when positioned in engaged relationship to its associated wheel.

A slightly modified form of invention is illustrated in FIGS. 15-16 of the drawings where the brake tongue 79 is shown as being attached to the lower surface of the depending brake element 51. The foot pedal 45 is constructed in generally the same manner as illustrated in the FIGS. 1-8 embodiment, including the elongated slot 55, the pivot shaft 57, and the coil spring 63 (shown in dotted lines). There is no separate pivotally mounted brake tongue, as in the other embodiments, but rather, the brake tongue 79 is attached to the lower end of the depending brake element 51 and includes a cam surface 81 for engaging the wheel 11 and a upwardly curving surface 83 conforming to the outer periphery of the wheel 11. Thus, as the foot pedal 45 is moved from the FIG. 15 released position to the FIG. 16 engaged position, the cam surface 81 will engage the wheel 11, causing the coil spring 63 within the depending brake element 51 to be compressed, resulting in movement of the pivot shaft 57 within the elongated slot 55, shortly thereafter followed by engagement of the upwardly curving concave surface 83 of the brake tongue 79, for releasable braking engagement with the wheel 11.

Figure 17:
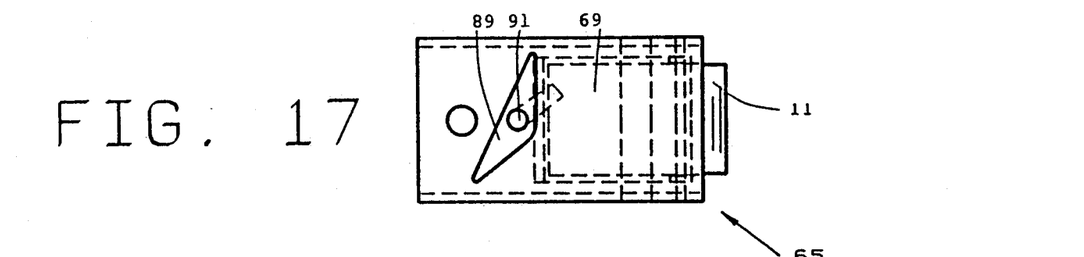
FIG. 17 is a reduced in size top plan view, partially in hidden lines, of a modified form of wheel brake shown in FIGS. 17-21 with a foot lever moved to the left or engaged position.
Figure 18:
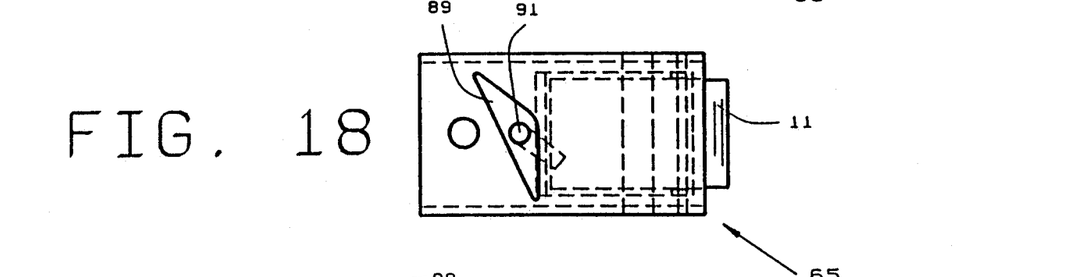
FIG. 18 is a top plan view similar to FIG. 17, but showing the foot pedal moved to the right or disengaged position.
Figure 19:
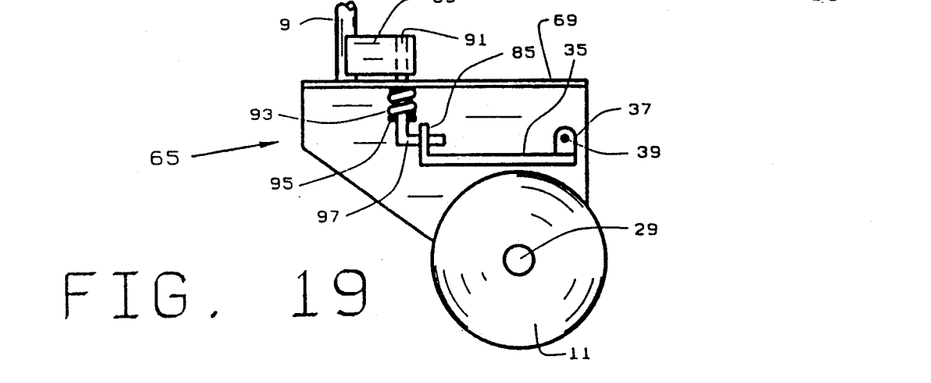
FIG. 19 is a side sectional view of the modified form of wheel brake illustrated in FIGS. 17-21.
Figure 20:
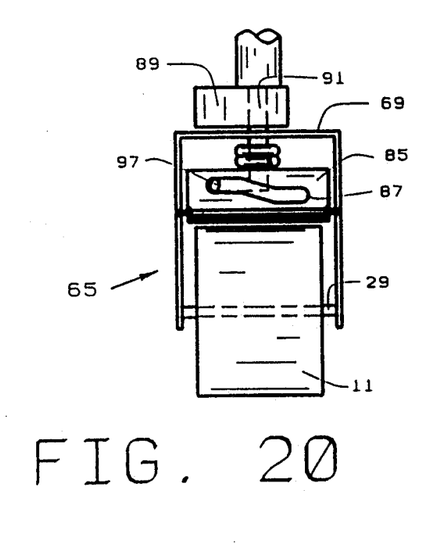
FIG. 20 is an end elevational view of the operation of the components when the foot pedal is moved to the right or disengaged position as illustrated in FIG. 18.
Figure 21:
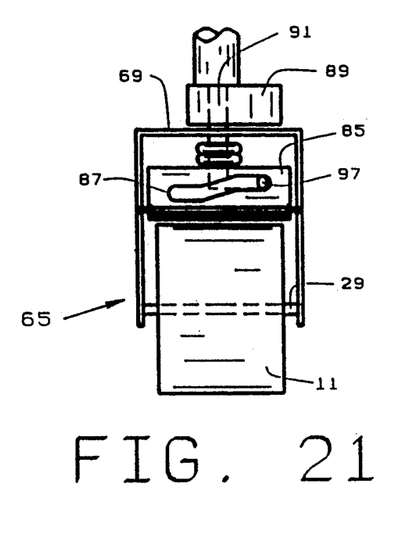
FIG. 21 is an end elevational view showing the operation of the wheel brake components when the foot pedal is moved to the left or engaged position, as illustrated in FIG. 17 of the drawings.

Referring now to the embodiment shown in FIGS. 17-21 of the drawings, it will be seen that there are several changes or modifications over and above those disclosed in the previous embodiments. In this particular embodiment, the brake tongue 35 is pivotally mounted with pivot shaft 39 to the single yoke 65 in a slightly different location than that illustrated in the previous embodiments, but still extends above and across the wheel 11, as best illustrated in FIG. 19 of the drawings. At the outer free end of the brake tongue 35, there is an upwardly directed end section 85 with a cam slot 87 formed therein as shown in FIGS. 20-21 of the drawings. Also in this particular embodiment, the foot pedal 89 is not moved upwardly or downwardly, but is moved horizontally to the left or horizontally to the right, as shown in FIGS. 17-18 of the drawings, for releasing or engaging the wheel 11 in selective braking engagement. In this connection, note that the foot pedal 89 is a rectangular shaped element that is pivotally attached to the shaft 91, the latter being pivotally mounted to the upper wall 69 of the single yoke 65. The shaft 91 also extends below the upper wall 65 and mounts a coil spring 93 between a retaining ring 95 and the undersurface of the upper wall 69, as best shown in FIGS. 19-21 of the drawings. The outer free end 97 of the shaft 91 extends generally transversely to the shaft 91 and forms a cam follower that extends through the cam slot 87 of the brake tongue.

Thus, when the foot pedal is moved, for example, by the toe of a user to the position shown in FIG. 17 of the drawings, the cam follower 97 will be located in the upper portion of the cam slot 87 through which no downward pressure is applied on the brake tongue 35. In this position, the wheel 11 is in released position and the shopping cart or other wheeled equipment can be moved accordingly. However, when the foot pedal 91 is moved by the user's foot, typically the front of a user's shoe, to the position shown in FIG. 18 of the drawings, the cam follower 97 will be moved in a lower portion of the cam slot 87, as best seen in FIG. 21 of the drawings, where downward pressure is exerted on the brake tongue 35 so as to bring it into selective braking engagement with the wheel 11. In this position, the wheel 11 is prevented from rotating, thereby immobilizing the shopping cart or other wheeled equipment.

From the foregoing, it will now be appreciated that the foot operated wheel brake of the present invention provides a uniquely constructed device to provide selective braking engagement on a wheel associated with the shopping cart or other wheeled equipment, to immobilize same. The foot operated wheel brake has been constructed with long life and durability in mind, in view of the abuse that is expected by users and weather conditions. At the same time, a minimum number of parts have been employed to make a highly effective, economical and easy to operate foot operated braking system.

In view of the above, it will be seen that the several objects and features of the invention are achieved and other advantageous results obtained.

As various changes could be made in the above construction without departing from the scope of the invention, it is intended that all matter contained in the above description or shown in the accompanying drawings shall be interpreted as illustrative and not in a limiting sense.

We claim:

1. A wheel brake comprising:
   a yoke depending from a lower end of a leg support and including a pair of generally parallel downwardly extending arms;
   a wheel rotatably mounted on an axle extending between said generally parallel arms;
   a brake tongue pivotally mounted at one end to said yoke above said wheel and extending across at least part of said wheel;
   a foot pedal pivotally mounted to said yoke in spaced relationship to said brake tongue for movement between engaged and released positions relative to said wheel;
   said foot pedal including a depending brake element for engaging and depressing said brake tongue into braking engagement with said wheel when said foot pedal is moved into engaged position by a user;
   a spring biased camming means operatively engaging both said depending brake element and said brake tongue for maintaining the depending brake element in releasable braking engagement with said wheel through said brake tongue until the foot pedal is moved to released position by a user where the depending brake element disengages the brake tongue;
   wherein said spring biased camming means includes spring means connected between said depending brake element and brake tongue and cam means operating between said depending brake element and brake tongue;
   wherein said spring means and cam means are connected to one another in juxtaposed relationship;
   wherein said depending brake element includes a lower camming surface for engaging said brake tongue;
   a pivot shaft supporting said foot pedal between the arms of said yoke;
   said pivot shaft being received within an elongated opening formed in said depending brake element for upward and downward movement of said depending brake element; and
   a spring captured between the foot pedal pivot shaft and the lower camming surface of said depending brake element, enabling said aforementioned spring biased camming engagement between said depending brake element and brake tongue until the foot pedal is moved to a released position.

2. A wheel brake comprising:

a yoke depending from a lower end of a leg support and including a pair of generally parallel downwardly extending arms;

a wheel rotatably mounted on an axle extending between said generally parallel arms;

a brake tongue pivotally mounted at one end to said yoke above said wheel and extending across at least part of said wheel;

a foot pedal pivotally mounted to said yoke in spaced relationship to said brake tongue for movement between engaged and released positions relative to said wheel;

said foot pedal including a depending brake element for engaging and depressing said brake tongue into braking engagement with said wheel when said foot pedal is moved into engaged position by a user;

a spring biased camming means operatively engaging both said depending brake element and said brake tongue for maintaining the depending brake element in releasable braking engagement with said wheel through said brake tongue until the foot pedal is moved to released position by a user where the depending brake element disengages the brake tongue;

wherein said sping biased camming means includes spring means connected between said depending brake element and brake tongue and cam means operating between said depending brake element and brake tongue;

wherein said spring means and cam means are spaced from one another;

a pivot shaft between the arms of said yoke;

said pivot shaft being received within an elongated opening formed in said depending brake element for upward and downward movement of said depending brake element;

a spring having one end attached to said brake tongue at a position spaced from said depending brake element and having a second end connected to said foot pedal pivot shaft; and a lower camming surface formed on said depending brake element for camming engagement with said brake tongue when said foot pedal is moved into engaged position relative to said wheel.

* * * * *